United States Patent [19]

Shirley et al.

[11] 4,025,755

[45] May 24, 1977

[54] THERMOSTATIC ELECTRIC CABLE HEATER

[75] Inventors: John W. Shirley; James V. DePhillips, both of Chicago, Ill.

[73] Assignee: Wrap-On Company, Inc., Chicago, Ill.

[22] Filed: Nov. 11, 1975

[21] Appl. No.: 630,766

[52] U.S. Cl. .............................. 219/549; 200/302; 219/528; 219/535; 337/113; 337/381; 340/252 H
[51] Int. Cl.² ........................................ H05B 3/56
[58] Field of Search .......... 219/212, 220, 269, 528, 219/535, 549; 337/94, 112, 113, 327, 380, 381; 338/214; 200/302, 333; 340/252 H

[56] References Cited
UNITED STATES PATENTS

| | | | |
|---|---|---|---|
| 2,824,209 | 2/1958 | Leopold | 219/528 |
| 3,108,175 | 10/1963 | Zartman et al. | 219/212 X |
| 3,119,926 | 1/1964 | Mills et al. | 219/212 |
| 3,305,668 | 2/1967 | Smith | 219/528 |
| 3,408,469 | 10/1968 | Mills | 337/113 X |
| 3,541,488 | 11/1970 | Odson | 337/112 X |
| 3,629,765 | 12/1971 | Hanson | 337/113 X |
| 3,851,149 | 11/1974 | Daley | 219/528 |

*Primary Examiner*—Volodymyr Y. Mayewsky
*Attorney, Agent, or Firm*—Hume, Clement, Brinks, Willian & Olds, Ltd.

[57] ABSTRACT

An improved thermostatic electrical cable heater is disclosed which permits more accurate temperature sensing by the thermostat and better control over the temperature of the object being heated. This improved sensing and temperature control is accomplished by isolating the thermostat and its surrounding insulated envelope from the electrical resistance heating elements of the cable heater.

5 Claims, 3 Drawing Figures

THERMOSTATIC ELECTRIC CABLE HEATER

BACKGROUND OF THE INVENTION

This invention relates to electrical heating devices and more particularly to elongated, flexible electrical resistance cable heaters which have thermostatic control.

The present invention is directed to inexpensive electrical resistance cable heaters adapted to be wrapped about pipes, buried in seed starting beds and the like. The inexpensive cable heaters of the kind to which the present invention is directed include a relatively thin, flexible heating cable which have elongated, electrically conductive resistance heating elements enclosed in flexible insulators, a thermostat for controlling the energization of the heating elements and an insulated envelope for enclosing the thermostat.

One of the typical uses for such cable heaters is to heat water pipes which are exposed to temperatures which might otherwise freeze and break. For instance, water pipes under house trailers, along outside walls of buildings and in chemical plants are frequently wrapped with cable heaters of this type with the thermostat set to provide current to the cable heater to maintain the water in the pipe above 32° F to keep it from freezing.

Another typical use for the electrical resistance cable heaters of the present invention is to maintain the soil in seed starting beds at an elevated temperature of about 72°–78° F in order to promote the quick growth of the seeds and seedlings planted in the bed.

The construction of a typical prior art thermostatic cable heater device is illustrated in FIGS. 1–3 of U.S. Pat. No. 3,851,149, issued Nov. 26, 1974 to William C. Daley. As shown in FIGS. 2 and 3 of that patent, the insulated envelope which surrounds the thermostat also encloses the end portions of the resistance heating elements.

One of the major problems which has been encountered with these thermostatic cable heaters is that the resistance heating elements are frequently shut off by the thermostat even though the temperature of the environment is significantly below the on-off set point of the thermostat. Another major problem takes the form of repeated on and off cycling of the heating elements at temperatures at which they should be continually heating. Due to these problems, the heating cable does not maintain the proper predetermined temperature around the object being heated.

These temperature control problems are believed to originate from the fact that every time the resistance heating elements are energized, they give off heat not only to the surrounding environment but also to the air within the envelope. This causes the temperature of the air within the envelope to significantly exceed that of the surrounding environment and causes the thermostat to prematurely shut off current to the heating elements. Of course, as soon as the resistance heating elements have been shut off for a noticeable length of time, the temperature begins to drop in the envelope and it eventually falls below the on-off set point at which time the circuit is again energized and the cycle begins anew. This latter behavior is believed to be the cause of the constant on-off cycling of the cable heater. The end result of these temperature control problems is that the ability of the cable heater to bring the object to be heated to the proper temperature is severely impaired.

SUMMARY OF THE INVENTION

This invention relates to a thermostatic electrical cable heater device which has a relatively thin, flexible heating cable including one or more elongated, electrically conductive resistance heating elements which are enclosed in flexible insulators, a thermostat for controlling the energization of the heating elements and an insulated envelope for enclosing and protecting the thermostat. In the cable heater device of the present invention, no portion of the resistance heating elements is enclosed within the thermostat containing envelope.

In a preferred embodiment, the thermostat is isolated from the resistance heating elements by insulated, low resistance electrically conductive leads which electrically connect the thermostat to the heating elements. In this embodiment, the insulated thermostat envelope encloses the thermostat and only a portion of the low resistance leads that connect the thermostat to the heating elements. The thermostat containing envelope does not enclose any portion of the resistance heating elements. Preferably, the points of attachment between the low resistance electrically conductive leads and the relatively high resistance heating elements of the cable heater are enclosed in additional insulated envelopes in close proximity to, but not a part of, the thermostat containing envelope.

By isolating the thermostat and the thermostat envelope from the resistance heating elements, a significantly more accurate temperature is maintained in the envelope. This construction substantially reduces, if not eliminates, the premature shutting off of the heating elements before the proper temperature is reached and the on-off cycling problem encountered with the prior art devices. The present invention also provides significantly better temperature control over the object being heated and promotes better operation of the thermostatic cable heaters than is available with the prior art devices.

Additional features and advantages of this invention are described in, and will appear from the description of the preferred embodiments which follow and from the drawing to which reference is now made.

DESCRIPTION OF THE PREFERRED EMBODIMENTS

Figure 1:
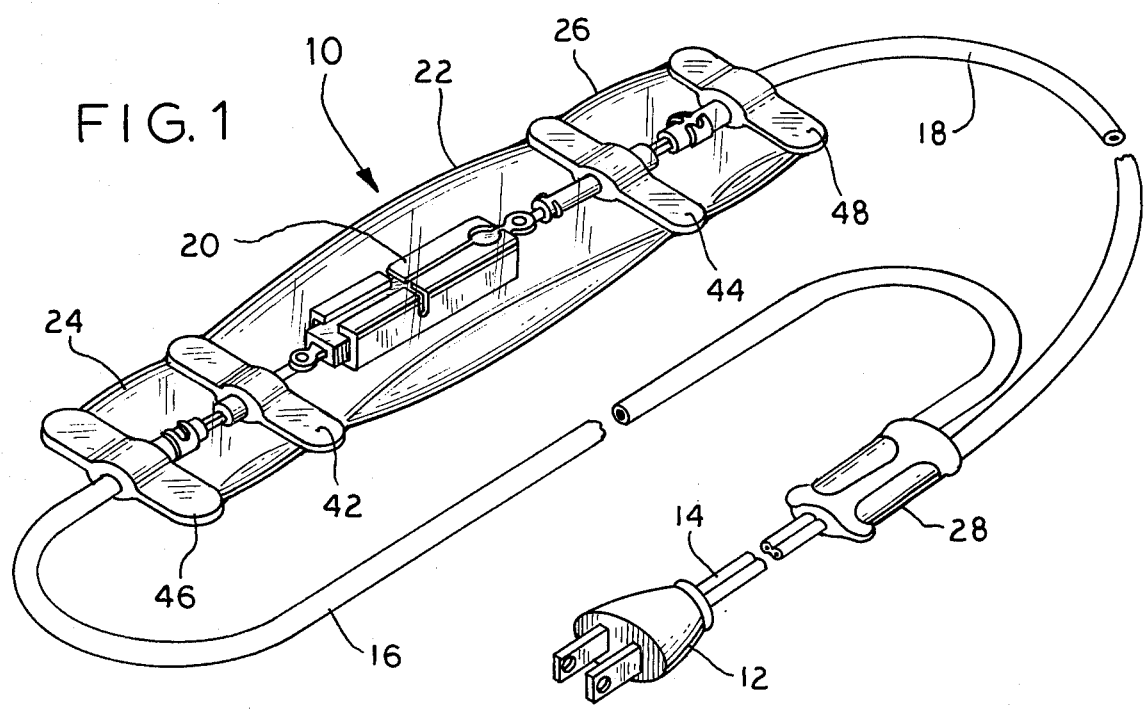
FIG. 1 is a perspective view of a thermostatic cable heater device constructed in accordance with the present invention.

Referring particularly to FIG. 1, a thermostatic electrical cable heater device constructed in accordance with the present invention is indicated generally at 10. Cable heater 10 has an electrical plug 12 for connection to a source of electrical power and a cord 14 which is a standard electrical conducting cord insulated with a plastic material. Cable heater 10 also includes elongated, flexible electrical heating elements 16 and 18 which are made of electrical conducting materials of relatively high resistance and are embedded in flexible insulating material such as a polyvinyl plastic.

Cable heater 10 has a thermostat 20 electrically connected to the resistance heating elements 16, 18 and to power supply cord 14. Thermostat 20 is set at a predetermined temperature. Whenever the environmental temperature drops below the predetermined temperature, the thermostat circuit closes and resistance heating elements 16, 18 are energized. Above the predetermined temperature, the thermostat circuit is open and the resistance heating elements can not be energized. If the cable heater is intended to be wrapped around pipes to keep them from freezing, the predetermined thermostat temperature is typically about 36°–40° F. In soil bed applications, typical thermostat preset temperatures are on the order of 74°–78° F.

Cable heater 10 also includes a thermostat insulating envelope 22 to enclose and protect the thermostat and its electrical connection to the remainder of the device from moisture and the elements. This envelope is advantageously made of plastic and is preferably translucent. Additional insulating envelopes 24, 26, 28 are also provided to enclose and protect the other electrical connections of cable heater 10.

Figure 2:
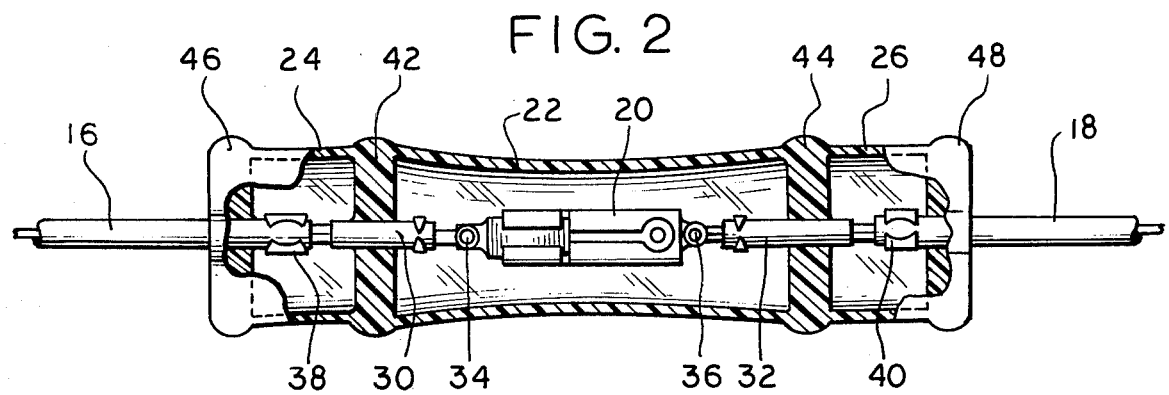
FIG. 2 is a top elevation view of the thermostat portion of the device of FIG. 1, with the envelopes cut away, showing the thermostat and its attachment to the heating elements.

The improved construction of the thermostat portion of the cable heater device of the present invention is best illustrated in FIG. 2. Thermostat 20 is connected to resistance heating elements 16, 18 by relatively low resistance electrically conductive insulated leads 30, 32.

Leads 30, 32 are attached to thermostat 20 at junctions 34, 36. Lead 30 is attached to resistance heating element 16 at junction 38 and lead 32 is attached to resistance heating element 18 at junction 40. Leads 30 and 32 can be made from any of a number of low resistance electrically conductive materials, and for example, may be standard No. 18 guage copper conducting wire similar to that used for cord 14.

As illustrated, thermostat 20 and junctions 34, 36, 38, 40 are enclosed by a series of separate insulating envelopes envelopes 22, 24, 26. Thermostat insulating envelope 22 encloses thermostat 20, junctions 34, 36 which connect leads 30, 32 to thermostat 20 and a portion of leads 30, 32. Insulating envelope 24 encloses junction 38 as well as a portion of heating element 16 and lead 30. Insulating envelope 26 encloses junction 40 and a portion of heating element 18 and lead 32.

As illustrated in FIGS. 1 and 2, insulating envelopes 22, 24, 26 are all made from a single piece of translucent plastic tubing. The individual envelopes are separated from one another by heat seals 42, 44. Additional heat seals 46, 48 are provided to close the ends of the plastic tube and to form the outer boundaries of envelopes 24, 26. Although a single piece of plastic tubing is used to form all three envelopes, each envelope is separate and independent from the other and is isolated, as that term is used herein, from the others because of the electrical and thermal insulating properties of the platic tubing. Alternatively, envelopes 22, 24, 26 could each be made from separate pieces of plastic tubing.

Because of this construction, thermostat envelope 22 does not enclose or come in contact with any portion of resistance heating elements 16, 18. Thus, the air trapped within thermostat envelope 22 more accurately reflects the temperature of the surrounding environment since it is relatively unaffected by the heat given off by the resistance heating elements. The result is that thermostat 20 does not, as was the problem heretofore, de-energize heating elements 16, 18 at temperatures below the predetermined thermostat temperature. Furthermore, the on-off cycling encountered heretofore has also been virtually eliminated by the present invention.

Figure 3:
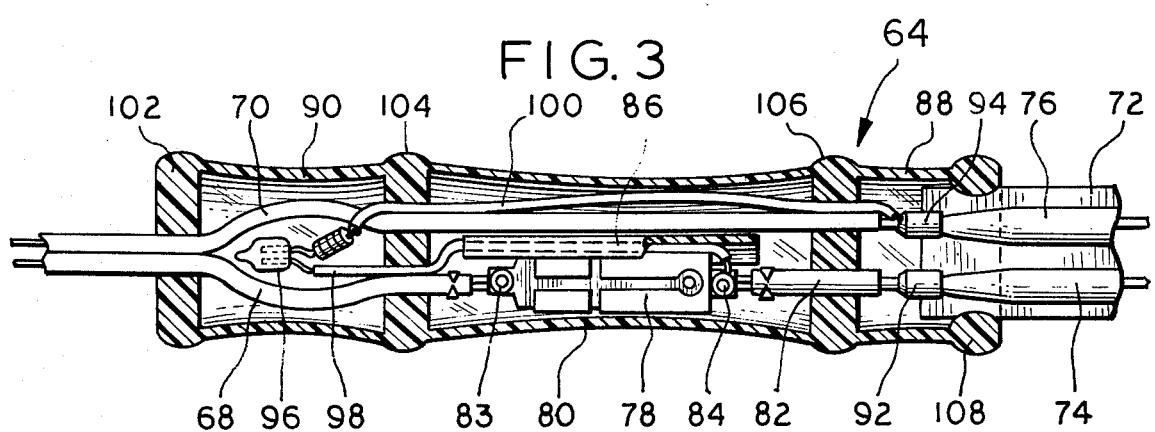
FIG. 3 is a top elevation view of the thermostat portion of an alternative thermostatic cable heater device constructed in accordance with the present invention, with the envelopes cut away, showing the thermostat and its attachment to the heating elements.

An alternative embodiment of the thermostatic cable heater of this invention is illustrated in FIG. 3. The thermostatic cable heater device shown in that figure, 64, is also known as a heat tape. Heat tape 64 includes a cord 66 having two insulated conductor elements 68, 70 which are attached to a plug (not shown). Also included in heat tape 64 is tape body 72 which is preferably a piece of flexible polyvinyl plastic material of relatively thin dimensions. Tape body 72 includes a pair of electrical resistance heating elements 74, 76 which are embedded in tape body 72.

A thermostat 78 is located between cord 66 and tape body 72. This thermostat is enclosed in a thermostat envelope 80 which also encloses a portion of insulated conductors 68, 70 and a portion of a low resistance, insulated electrically conductive lead 82 which connects thermostat 78 to resistance heating elements 74. A separator 86 keeps insulated conductor 70 from contacting thermostat 78.

Heat tape 74 has two additional envelopes 88, 90 located in the thermostat section. Envelope 88 encloses junctions 92, 94 between electrical resistance elements 74, 76 and insulated conductor 70 and lead 82. The remaining envelope 90 encloses indicator light 96 which lights up when the thermostat is closed and electrical heating elements 74, 76 are operating. Indicator light 96 is connected to thermostat 78 at junction 84 via insulated lead 98. The indicator light is connected to tape body 72 at junction 94 via insulated lead 100. Further details of the operation of the indicator light can be obtained from U.S. Pat. No. 3,305,668 issued Feb. 21, 1967 to David C. Smith.

The three insulated envelopes, 80, 88, 90 may all be made from a single piece of plastic tubing which is heat sealed at 102, 104, 106, 108 to provide the separate and isolated envelopes.

The embodiments described herein are intended to be exemplary of the thermostatic cable heater devices which fall within the scope of the present invention. However, one skilled in the art would certainly be expected to be able to make modifications and variations of the preferred embodiments described herein without departing from spirit and scope of the invention as it is defined in the following claims.

We claim:
1. An electrical heating cable device, comprising:
   thin, flexible, elongated, electrically conductive, resistance heating elements embedded in flexible insulators;
   a thermostat, for controlling energization of the heating elements, enclosed in an insulated thermostat envelope and connected to the heating elements by insulated, low resistance electrical conductors, said heating elements being entirely outside of the thermostat envelope; and
   additional insulating envelope means for enclosing the points of attachment between the low resistance electrical conductors and the ends of the heating elements.
2. An electrical heating cable device, comprising:

thin, flexible, elongated, electrically conductive, resistance heating elements embedded in flexible insulators;

a thermostat for controlling energization of the heating elements;

insulated, low resistance, electrically conductive leads for electrically connecting the thermostat to the heating elements;

a thermostat insulating envelope enclosing the thermostat and only a portion of the low resistance leads; and additional insulating envelopes for enclosing the points of attachment between the low resistance electrical conductors and the ends of the heating elements.

3. An electrical heating cable device, comprising:

a relatively thin, flexible heating cable including an elongated, electrically conductive, resistance heating element enclosed in a flexible insulator;

a thermostat for controlling energization of the heating element;

an insulated, low resistance, electrically conductive lead for electrically connecting the thermostat to the heating element;

a thermostat insulating envelope enclosing the thermostat and only a portion of the low resistance lead; and an additional insulatinng envelope for enclosing the point of attachment between the low resistance lead and the end of the heating element.

4. An electrical heating cable device, comprising:

a relatively thin, flexible heating cable including an elongated, electrically conductive, resistance heating element enclosed in a flexible insulator;

a thermostat for controlling energization of the heating element;

an insulated, power supply cord connected to one end of the thermostat, an insulated low resistance, electrically conductive lead for electrically connecting the other end of the thermostat to the heating element;

a thermostat insulating envelope enclosing the thermostat, the end of the supply cord connected to the thermostat and only a portion of the low resistance lead; and an additional insulating envelope for enclosing the point of attachment between the low resistance lead and the end of the heating element.

5. The electrical heating cable device of claim 4, wherein the end of the heating element not connected to the low resistance lead is connected to the electrical supply cord.

* * * * *